UNITED STATES PATENT OFFICE.

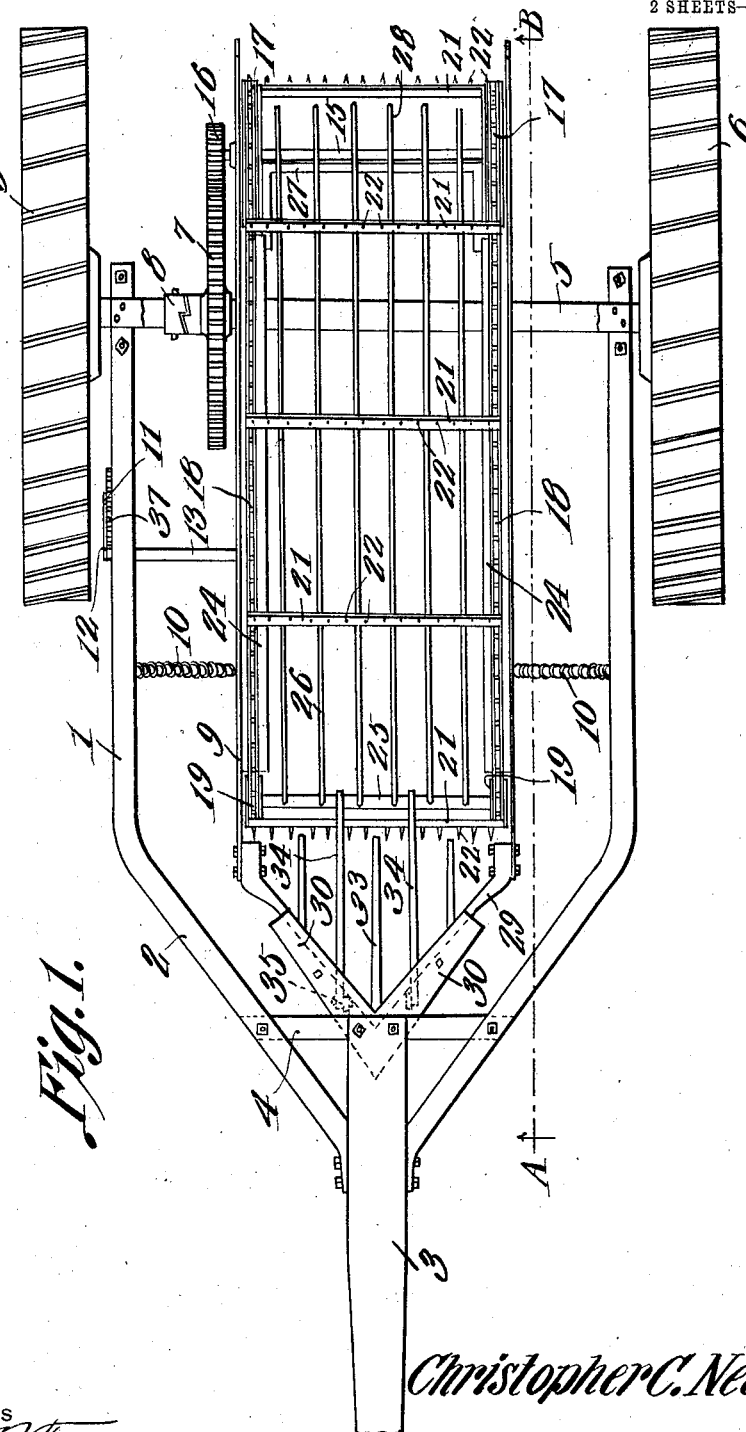

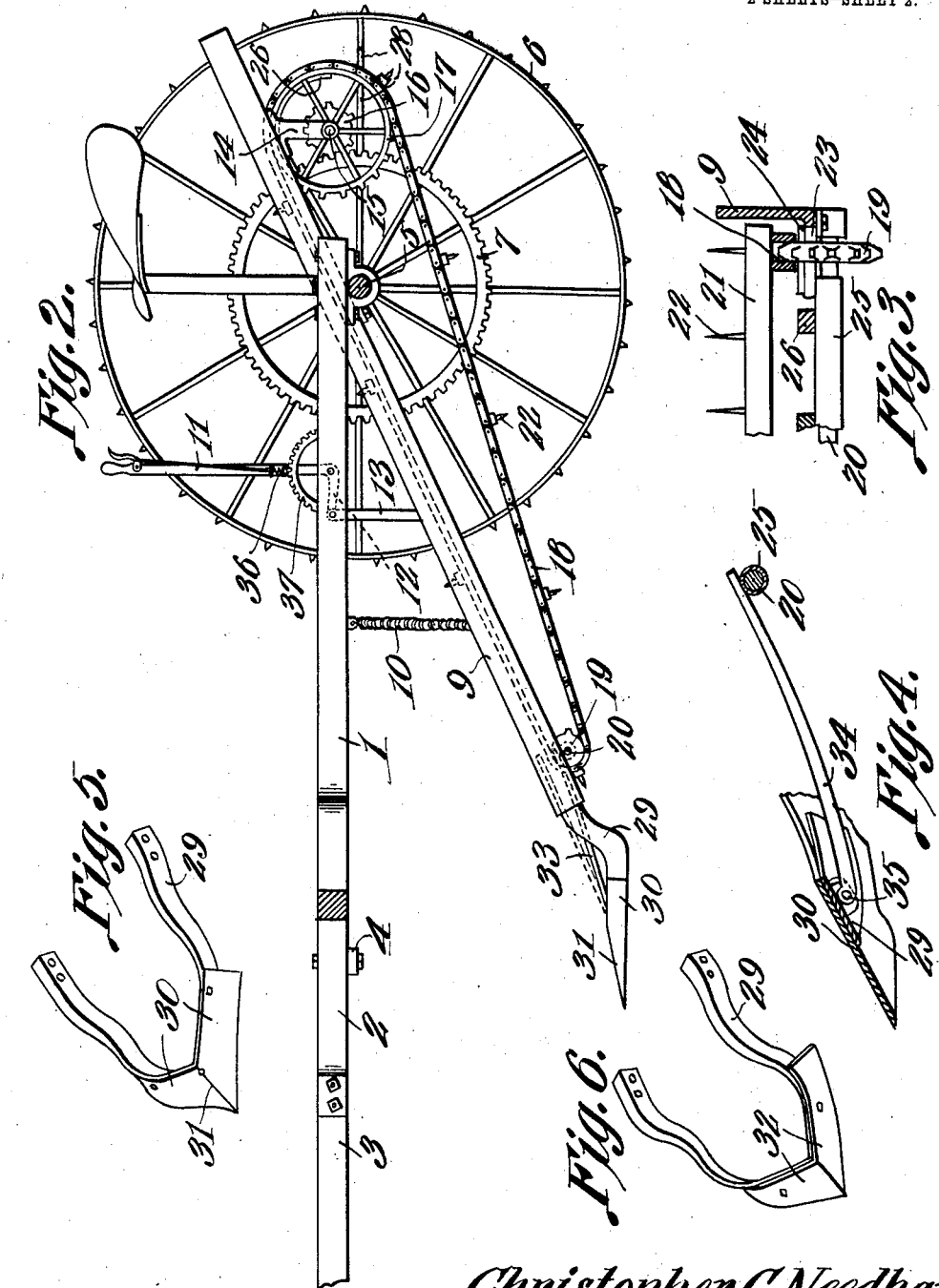

CHRISTOPHER C. NEEDHAM, OF IVOR, VIRGINIA.

PEANUT-HARVESTER.

1,047,108.     Specification of Letters Patent.     Patented Dec. 10, 1912.

Application filed January 10, 1912. Serial No. 670,516.

*To all whom it may concern:*

Be it known that I, CHRISTOPHER C. NEEDHAM, a citizen of the United States, residing at Ivor, in the county of Southampton and State of Virginia, have invented a new and useful Peanut-Harvester, of which the following is a specification.

This invention relates to harvesters primarily designed for use in harvesting peanuts although the same can also be employed in digging potatoes.

One of the objects of the invention is to provide improved means for digging the peanuts and for subsequently engaging the tops or vines and drawing the vegetation upwardly within the machine whereby dirt adhering thereto is permitted to fall to the ground before the vegetation is discharged into the wagon or other receptacle provided therefor.

A further object is to provide improved means for agitating the vegetation during its movement through the machine whereby the dirt adhering thereto is loosened and thus permitted to separate easily.

Another object is to provide a machine of this character which is simple in construction, light and durable and which can be easily operated.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—Figure 1 is a plan view of the machine. Fig. 2 is a section on line A—B Fig. 1. Fig. 3 is an enlarged transverse section through one side portion of the elevator frame. Fig. 4 is an enlarged vertical longitudinal section through the digger and showing a vibrating arm, the support for the arm being shown in section. Fig. 5 is a perspective view of a digger designed for use in harvesting peanuts. Fig. 6 is a similar view showing a slightly modified form of digger such as adapted for use in harvesting potatoes.

Referring to the figures by characters of reference 1 designates the main frame of the machine, the sides thereof converging forwardly as at 2 and being secured to the draft beam 3. A cross brace 4 may be connected to the front portion of the frame and to the beam 3 if desired. A revoluble drive axle 5 is journaled on the rear portion of the frame 1 and is supported by wheels 6, there being a drive gear 7 loosely mounted on the axle 5 and adapted to be coupled thereto by means of a clutch 8 which can be operated by any suitable mechanism provided for that purpose.

An elevator frame 9 is mounted on the axle 5 and is adapted to swing vertically relative thereto, said frame being inclined downwardly and forwardly and being yieldably supported by springs 10 which extend upwardly to the sides of the frame 1. An adjusting lever 11 is fulcrumed on the main frame 1 and has an arm 12 extending therefrom. This arm is connected, by means of a link 13, to one side of the frame 9 and it will be apparent that by shifting the lever 11, frame 9 can be raised or lowered at its front end, it swinging on the axle 5 as a fulcrum. Brackets 14 extend downwardly from the sides of frame 9 near the upper or rear end thereof and a shaft 15 is journaled in these brackets and carries a gear 16 meshing with the drive gear 7. Sprockets 17 are secured to and rotate with the shaft 15 and are located close to the inner faces of the sides of frame 9. These sprockets are engaged by conveyer chains 18 extending longitudinally of the frame 9 and into engagement with smaller sprockets 19 carried by the end portions of a shaft 20 mounted in the frame 9 near the front or lower end thereof. Cross bars 21 are secured at their ends to the chains 18 and are parallel, each bar carrying a series of teeth 22 adapted to engage the tops or vines as hereinafter set forth.

In order that the upper runs of the chains 18 may be properly supported between the sprockets 17 and 19, the sides of the frame 9 are preferably formed of angle irons, as shown particularly in Fig. 3, the inwardly extending flanges of these sides, and which have been indicated at 23, serving to support wear plates 24 with which the chains contact.

A sleeve 25 is fitted loosely on the shaft 20 between sprockets 19 and supporting rods 26 are secured at their forward ends to the sleeve and extend rearwardly within the frame 9. These rods are parallel and are supported at one or more points by cross bars 27 carried by the frame 9, the rear ends of the rods being curved downwardly as shown at 28 so as to lie close to the path of the bars 21 where they pass over the sprockets 17.

The digger is attached to the front or lower end of the frame 9 and consists of a downwardly and forwardly extended frame 29 to which a plow is detachably secured, said plow being formed of integral forwardly converging blades 30, these blades being provided with straight lower edges and the two blades 30 being inclined upwardly and rearwardly. Thus it will be seen that a central upwardly and rearwardly inclined ridge 31 is formed at the front end of the plow and the straight flat blades 30 diverge rearwardly from it. The lower edges of the plow are normally horizontal and in the same plane and when the machine is in use the said plow is adapted to travel substantially horizontally under the surface of the soil so as to loosen the vegetation and force it upwardly above the surface. The blades of the plow are spread apart a sufficient distance to enable the digger to extend throughout the width of the hill to be opened.

As hills containing peanuts are much wider than hills in which potatoes are planted, it will be apparent that a digger to be used in harvesting potatoes can be shorter and narrower than one used in harvesting peanuts. A potato digger has been shown in Fig. 6 and in said figure it will be noted that the blades 32 are much shorter than the blades 30 and are not spread apart to the same extent.

In order that the tops or vines may be guided onto the elevator, a series of fingers 33 extends upwardly and rearwardly from the digger, these fingers being attached to the frame 29 and terminating short of the sleeve 25. Between these fingers 33 are interposed agitating arms 34 hingedly connected to the frame 29 as indicated at 35 and bearing downwardly, at their upper ends, on the sleeve 25.

When the machine is drawn forward axle 5 is rotated by the wheels 6 and gear 7 will not be actuated unless the clutch 8 is shifted so as to couple the gear to the axle. When gear 7 rotates it drives gear 16 and the sprockets 17 are thus revolved and actuate the chains 18. The bars 21 are therefore brought successively around the sprockets 19 and thence upwardly over the sprockets 17. The blades 30 of the digger cut under the peanuts and elevate them above the surface of the ground and onto the fingers 33 and 34. The tops or vines are engaged by the teeth 22 on the moving bars 21 and carried upwardly and rearwardly, thus dragging the peanuts along the fingers 33 and 34 and onto the guide or supporting rods 26. Each time one of the bars 21 passes under the arms or fingers 34 it elevates them and permits them subsequently to drop back to the sleeve 25. Thus the vegetation will be jolted and any dirt adhering thereto will drop to the ground before the peanuts are discharged from the machine at the upper or rear end of the conveyer frame. The frame 9 can be adjusted vertically by means of lever 11 as hereinbefore described and this lever may be provided with any suitable locking means, such as a pawl 36 and a segment 37 for holding the lever 11 and the frame 9 against movement.

What is claimed is:—

1. In a harvester the combination with spaced supporting members, of a conveyer including cross members movable longitudinally above said supporting members and having means for engaging vegetation, a digger, parallel fixed and movable means for directing material from the digger and onto the conveyer, said movable means being interposed between the fixed means, and means operated by the conveyer for agitating said movable directing means to jolt the material thereon.

2. A harvester including an elevator frame, an endless conveyer carried thereby and including spaced transverse members and teeth upon said members, a digger connected to one end of the elevator frame, alternately arranged fixed and movable devices for directing material from the digger onto the conveyer, said devices being substantially parallel, and means for actuating the conveyer to bring the cross members successively into and out of engagement with the movable devices to elevate them above the fixed devices and then to release them.

3. In a harvester the combination with a supporting structure, of an elevator frame, an endless conveyer thereon, said conveyer including spaced transversely extending members and means on the members for engaging vegetation, spaced rods fixedly mounted within the elevator frame for supporting vegetation engaged by the conveyer, a digger, separately movable fingers hinged to the digger for directing material from the digger and onto the conveyer, means operated by the conveyer for moving the fingers to jolt the vegetation thereon, and fixed fingers interposed between the movable fingers and extending from the digger, said fixed fingers coöperating with the movable fingers for directing material onto the conveyer.

4. In a harvester the combination with a supporting structure, of an elevator frame, an endless conveyer thereon, said conveyer including spaced transversely extending members and means on the members for engaging vegetation, spaced rods fixedly mounted within the elevator frame for supporting vegetation engaged by the conveyer, a digger, separately movable fingers hinged to the digger for directing material from the digger and onto the conveyer, means operated by the conveyer for moving the fingers to jolt the vegetation thereon, and fixed fingers interposed between the movable fingers and extending from the digger, said fixed fingers coöperating with the movable fingers for directing material onto the conveyer, all of said fingers being extended from the bottom face of the digger and at points below the upper edge thereof.

In testimony that I claim the foregoing as my own, I have hereto affixed my signature in the presence of two witnesses.

CHRISTOPHER C. NEEDHAM.

Witnesses:
SELINA WILLSON,
I. E. SIMPSON.

Copies of this patent may be obtained for five cents each, by addressing the "Commissioner of Patents, Washington, D. C."